US006578532B1

(12) United States Patent
Rowley

(10) Patent No.: US 6,578,532 B1
(45) Date of Patent: Jun. 17, 2003

(54) FUEL VAPORIZING AND MIXING SYSTEM AND METHOD

(76) Inventor: Gerald W. Rowley, 6101 SW. 48th Court, Davie, FL (US) 33304

( * ) Notice: Subject to any disclaimer, the term of this patent is extended or adjusted under 35 U.S.C. 154(b) by 0 days.

(21) Appl. No.: 10/053,120

(22) Filed: Jan. 23, 2002

(51) Int. Cl.[7] ............................................. F02M 31/00
(52) U.S. Cl. ................................................... 123/25 R
(58) Field of Search ................................. 123/557, 554, 123/527, 25 R, 25 A, 25 B, 25 C, 25 D, 25 N, 25 P

(56) References Cited

U.S. PATENT DOCUMENTS

| 1,319,718 | A |   | 10/1919 | Martin |         |
|-----------|---|---|---------|--------|---------|
| 3,306,273 | A | * | 2/1967  | Dolphin | 123/557 |
| 3,874,353 | A |   | 4/1975  | Wooldridge |     |
| 3,931,801 | A | * | 1/1976  | Rose et al. | 123/522 |
| 4,112,889 | A |   | 9/1978  | Harpman |       |
| 4,188,928 | A |   | 2/1980  | Faustinos |     |
| 4,398,523 | A |   | 8/1983  | Henson |        |
| 4,594,991 | A |   | 6/1986  | Harvey |        |
| 5,685,281 | A | * | 11/1997 | Li | 123/590 |

OTHER PUBLICATIONS

Paul Stenquist, Water Injection, Hot Rod, Jul. 1983, pp. 59 and 60.*

* cited by examiner

Primary Examiner—Noah P. Kamen
Assistant Examiner—Hyder Ali
(74) Attorney, Agent, or Firm—Oltman, Flynn & Kubler

(57) ABSTRACT

A fuel vaporization and mixing system is provided for producing a mixture of fuel vapor, atomized water and air for delivery into an internal combustion engine, the system being configured and positioned relative to the internal combustion engine to draw heat from the engine exhaust system to vaporize fuel for combining into the mixture.

14 Claims, 2 Drawing Sheets

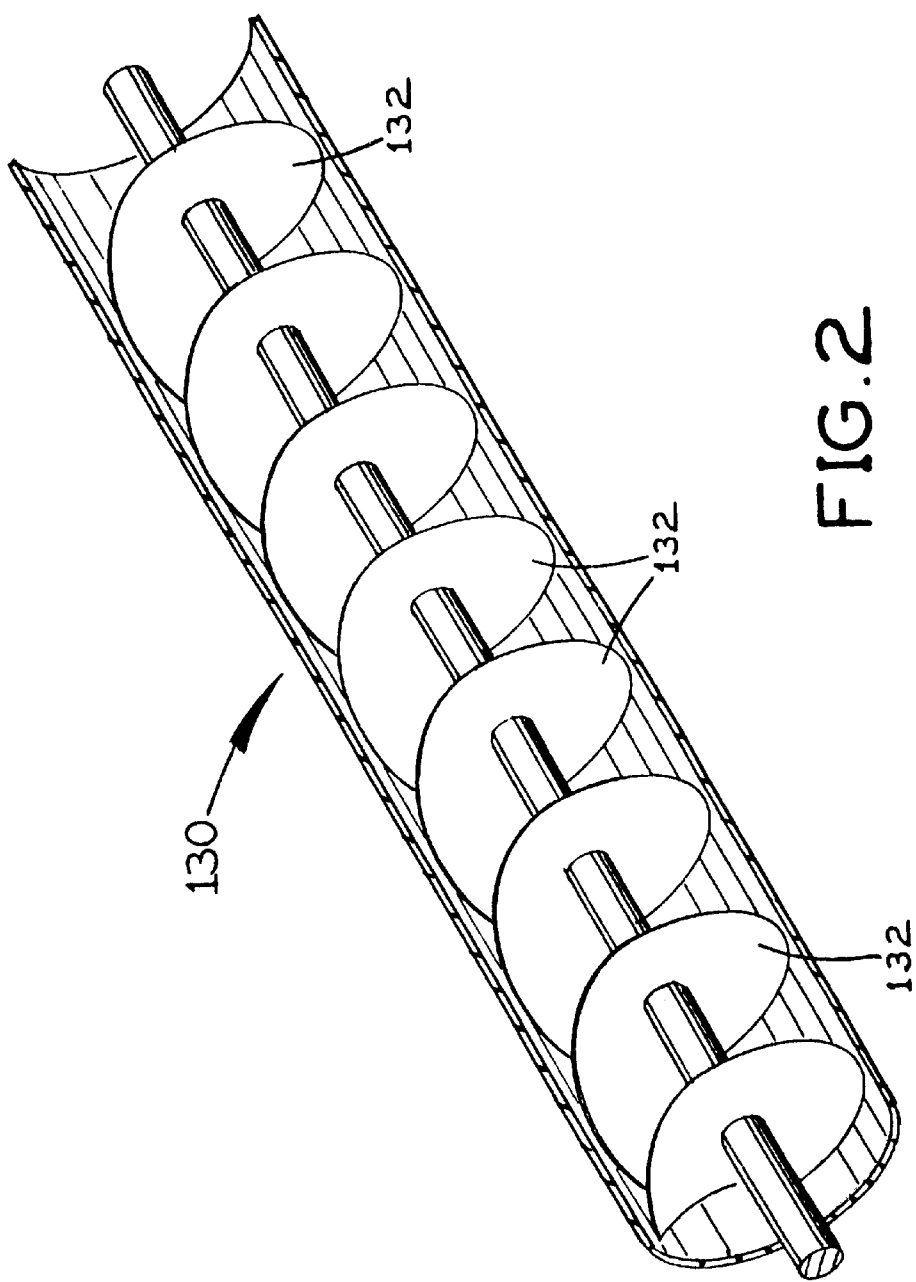

FUEL VAPORIZING AND MIXING SYSTEM AND METHOD

BACKGROUND OF THE INVENTION

1. Field of the Invention

The present invention relates generally to the field of fuel combustion and internal combustion engine design. More specifically the present invention relates to a fuel vaporization and mixing system for producing a mixture of fuel vapor, atomized water and air for delivery into an internal combustion engine, the system being configured and positioned relative to the internal combustion engine to draw heat from the engine exhaust system to vaporize fuel for combining into the mixture. While it is known that properly combining sprayed fuel and air with atomized water can boost horsepower and fuel efficiency, the automobile industry has failed to recognize that vaporizing the fuel with engine exhaust system heat prior to mixing with air and water is an efficient way of still further enhancing horsepower and fuel mileage.

The system includes a fuel tank for holding fuel prior to vaporization and mixing, a fuel pump in fluid communication with the fuel tank for delivering fuel from the fuel tank, a vacuum pump/or vacuum drawn off engine intake manifold with check valve, a fuel metering valve in fluid communication with the fuel pump for metering the flow of fuel from the fuel tank, a vapor collecting chamber in fluid communication with the fuel metering valve for holding fuel while the fuel is vaporized, the vapor collecting chamber being in thermal communication with the engine exhaust system to draw fuel vaporizing heat from the exhaust system, fuel blowing means mounted within the vapor collecting chamber for stirring and uniformly distributing the fuel vapor, a molecule mixture box in fluid communication with the vapor collecting chamber for receiving vaporized fuel from the chamber, a throttle mounting opening in the molecule mixture box wall containing a throttle, having a throttle body, for regulating the flow of air from the surrounding atmosphere into the molecule mixture box, an air filter mounted to the throttle body to filter air entering the throttle, a pressurizing air/water pump in fluid communication with the molecule mixture box, an air intake structure in fluid communication with the air/water pump for delivering air through the air/water pump into the molecule mixture box, a water holding tank in fluid communication with the air/water pump for delivering water through the air/water pump into the mixture box, an air/water injector positioned to receive and transform the air and water exiting the pump into a combined spray as the air and water enter the mixture box, and a spiral mixture delivery means for guiding the resulting mixture from the molecule mixture box into an intake manifold or port of an internal combustion engine. A method is also provided, including the steps of delivering sufficient heat into the fuel to transform the fuel into vaporized fuel; atomizing water; mixing metered quantities of the vaporized fuel and atomized water mist with a metered quantity of air to produce a fuel mixture; and delivering the fuel mixture into an internal combustion engine.

2. Description of the Prior Art

Many efforts have been made over the years to boost the performance of internal combustion engines running on standard, commercially available gasoline and other hydrocarbon based fuels. A good summary of known methods is provided in an article published on page 59 of the July 1983 edition of HOT ROD™ magazine, entitled Water Injection "Nearly all of the changes that an enthusiast might attempt [to boost horsepower] are designed to raise cylinder pressure: a higher compression ratio raises pressure by squeezing the mixture into a smaller combustion area; increasing spark advance raises cylinder pressure by giving the hot gases more time to expand; even valve timing and fuel system changes result in more cylinder pressure because they allow the cylinders to fill more completely.

"Low-octane fuels are incompatible with high cylinder pressure because they ignite easily. As a fuel's octane number increases, it becomes more resistant to self-ignition. As an engine's cylinder pressure increases, the combustion chamber temperature increases. A combination of relatively low-octane fuel and high combustion chamber temperature causes the fuel to ignite before the time of spark ignition. This means that the gases in the cylinder start burning and expanding before they should. When spark ignition does occur, a second flame front is developed. The two areas of combustion expand, causing tremendous pressure and heat between them. This results in uncontrolled, violent explosion of the unburned parts of the charge. This effect, known as detonation, breaks pistons, flattens bearings, and destroys engines.

"There are three ways to deal with detonation. You can (1) reduce cylinder pressure and sacrifice horsepower and efficiency, (2) buy expensive racing gasoline, or (3) inject water to control rising combustion chamber temperatures —undoubtedly the best solution.

"Water injection can work for you in two different ways . . . if it is injected properly and in the right amounts. A fully aerated water mist that mixes completely with the incoming charge can keep chamber temperatures below the flash point of low-octane fuel until the point of spark ignition. If the amount of water injected is not excessive, it will only keep the temperature just barely within limits and will not hinder combustion when the spark does occur. On the other hand, a well distributed, fully aerated charge will turn into a steam at the moment of combustion, expanding nearly 1700 times. . . . The expanding water vapor will actually increase pressure and, consequently, horsepower if it turns to steam at exactly the right time . . .

"Many water injection systems fail to accomplish this because the're really nothing more than squirt guns. . . . [T]hey merely deliver water under pressure to a carburetor without properly aerating it first."

The benefits of combining atomized water with the fuel/air mixture and the need to fully aerate the water component prior to mixing have been recognized for nearly two decades. Yet there has been no recognition of the need to fully aerate the fuel, which has at least equal capacity for boosting engine power and fuel mileage.

Wooldridge, U.S. Pat. No. 3,874,353, issued on Apr. 1, 1975, discloses an air and fuel mixing system using a bath of liquid fuel for contributing liquid fuel to the air. Martin, U.S. Pat. No. 1,319,718, issued on Oct. 28 1919, teaches a kerosene vaporizer for internal combustion engines in which an electric coil and engine exhaust gases provide vaporizing heat to the kerosene. Hensen, U.S. Pat. No. 4,398,523, issued on Aug. 16, 1983, reveals a fuel conservation device in which fuel is vaporized with a heating element. Harvey, U.S. Pat. No. 4,594,991, issued on Jun. 17, 1986, discloses a fuel and water vaporizer for internal combustion engines. Harpman, U.S. Pat. No. 4,112,889, issued on Sep. 12, 1978, teaches a fuel system and vaporizer for internal combustion engines. Faustinos, U.S. Pat. No. 4,188,928, issued on Feb. 19, 1980, reveals a fuel vaporizing apparatus for internal combustion engines. A problem with these prior devices and systems is that none teach or suggest the advantage of combining air and water with fuel which has been vaporized by engine exhaust system heat.

It is thus an object of the present invention to provide a fuel vaporization system which produces a fuel mixture including metered quantities of vaporized fuel, misted water and air, for high power combustion within an internal combustion engine.

It is another object of the present invention to provide such a fuel vaporization system which vaporizes fuel with heat received from the engine exhaust system.

It is still another object of the present invention to provide a fuel vaporization method for execution by the disclosed fuel vaporization system which includes the steps of vaporizing fuel with heat from an engine exhaust system and mixing the vaporized fuel with atomized water and with air to produce a fuel mixture, and delivering the fuel mixture into an internal combustion engine.

It is finally an object of the present invention to provide such a system which is reliable and inexpensive to manufacture.

SUMMARY OF THE INVENTION

The present invention accomplishes the above-stated objectives, as well as others, as may be determined by a fair reading and interpretation of the entire specification.

A fuel vaporization and mixing system is provided for producing a mixture of fuel vapor, atomized water and air for delivery into an internal combustion engine having an engine exhaust system, including a fuel source under vacuum to reduce the vaporization point of the fuel and for holding fuel prior to vaporization; a fuel pump in fluid communication with the fuel source for delivering fuel from the fuel source; a vapor collecting chamber in fluid communication with fuel pump for holding a quantity of fuel while the quantity of fuel is vaporized, the vapor collecting chamber being in thermal communication with the engine exhaust system to draw fuel vaporizing heat from the exhaust system; a molecule mixture box having a box wall and being in fluid communication with the vapor collecting chamber for receiving vaporized fuel from the vapor collecting chamber; a pressurizing air/water pump in fluid communication with the molecule mixture box; an air intake structure in fluid communication with the air/water pump for delivering air through the air/water pump into the molecule mixture box; a water source in fluid communication with the air/water pump for delivering water through the air/water pump into the molecule mixture box; and an air/water aerating mechanism positioned to receive aerate and mix the air and water exiting the air/water pump as the air and water enter the molecule mixture box.

The fuel source is optionally a fuel tank. The fuel vaporization and mixing system preferably additionally includes a fuel blowing mechanism mounted within the vapor collecting chamber for stirring and uniformly distributing fuel vapor. The fuel vaporization and mixing system preferably additionally includes a spiral mixture delivery structure for guiding and efficiently combining the mixture from the molecule mixture box to an internal combustion engine.

The fuel vaporization and mixing system preferably still additionally includes a throttle mounting opening in the molecule mixture box wall; and a throttle within the throttle mounting opening having a throttle body for regulating the flow of air from the surrounding atmosphere into the molecule mixture box. The throttle preferably additionally includes an air filter mounted to the throttle body to filter air entering the throttle.

The water source optionally is a water holding tank. The water source, the air intake structure, the air/water pump and the air/water aerating mechanism are placed in fluid communication with each other through a tubular air/water fluid manifold. The fuel blowing mechanism preferably includes a turbine blade rotatably mounted within the vapor collecting chamber and a turbine blade drive shaft onto which the turbine blade is mounted extending through and sealingly abutting a port in the vapor collecting chamber to a turbine drive motor located outside the vapor collecting chamber and drivably connected to the turbine blade drive shaft. The vapor collecting chamber preferably has an upper portion and the molecule mixture box preferably is in fluid communication with the upper portion of the vapor collecting chamber, to receive fuel only in vapor state.

The fuel vaporization and mixing system preferably additionally includes a fuel metering valve in fluid communication with the fuel pump for metering the flow of fuel from the fuel source into the vapor collecting chamber. The fuel source, the fuel pump and the fuel metering valve preferably are in fluid communication with each other through a segmented fuel line. The fuel metering valve preferably is a flow control metering valve.

A method is provided of producing a mixture of fuel vapor, atomized water and air and outside air for delivery into an internal combustion engine, including the steps of delivering sufficient heat into a quantity of fuel under less than atmospheric pressure to transform the quantity of fuel into vaporized fuel; atomizing water with air into a water mist; and mixing metered quantities of the vaporized fuel and water mist with a metered quantity of air to produce a highly combustible fuel mixture. The method preferably includes the additional step of delivering the fuel mixture into a spiral delivery tube eventually into the head chamber of an internal combustion engine.

An internal combustion engine is provided with a fuel vaporization and mixing system, including a fuel burning cylinder with a cylinder head for receiving a fuel mixture from a mixture delivery structure into the fuel burning cylinder; an engine exhaust system; a fuel source for holding fuel prior to vaporization; a fuel pump in fluid communication with the fuel source for delivering fuel under less than atmospheric pressure from the fuel source; a vapor collecting chamber in fluid communication with fuel pump for holding a quantity of fuel while the quantity of fuel is vaporized, the vapor collecting chamber being in thermal communication with the engine exhaust system to draw fuel vaporizing heat from the exhaust system; a molecule mixture box having a box wall and being in fluid communication with the vapor collecting chamber for receiving vaporized fuel from the vapor collecting chamber; a pressurizing air/water pump in fluid communication with the molecule mixture box; an air intake structure in fluid communication with the air/water pump for delivering air through the air/water pump into the molecule mixture box; a throttle body in fluid communication with the molecule mixture box for delivering ambient air to the molecule mixture box in the proper proportions to produce a highly combustible mixture; a water source in fluid communication with the air/water pump for delivering water through the air/water pump into the molecule mixture box; an air/water aerating mechanism positioned to receive aerate and mix the air and water exiting the air/water pump as the air and water enter the molecule mixture box and a spiral mixture delivery structure for guiding the mixture from the molecule mixture box into the fuel burning cylinder.

BRIEF DESCRIPTION OF THE DRAWINGS

Various other objects, advantages, and features of the invention will become apparent to those skilled in the art from the following discussion taken in conjunction with the following drawings, in which:

FIG. 2 is a close-up cross-sectional view of the spiral fins of the mixing delivery means.

DETAILED DESCRIPTION OF THE PREFERRED EMBODIMENTS

Figure 1:
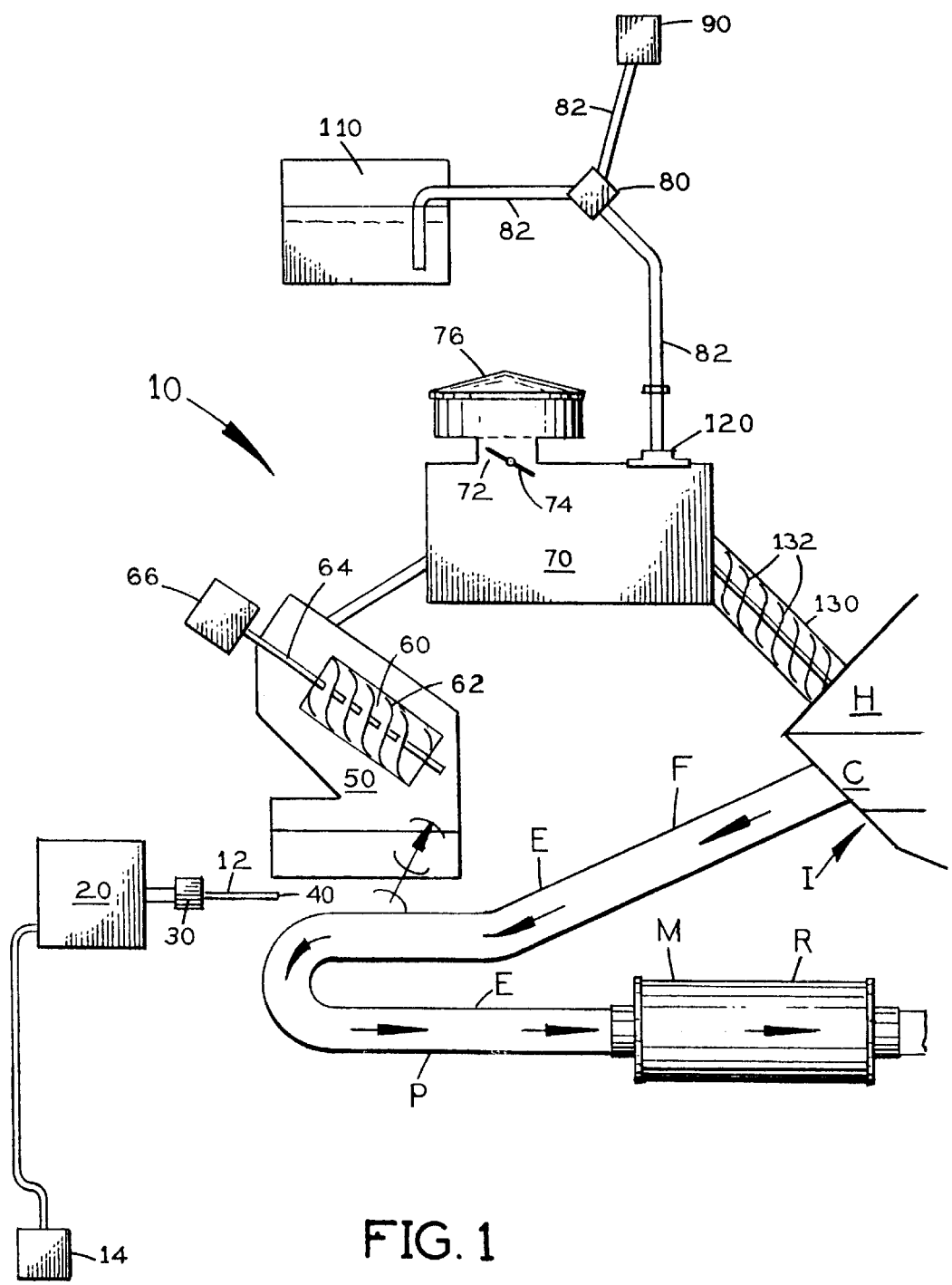
FIG. 1 is a schematic of the inventive fuel vaporizing and mixing system combined with an internal combustion engine.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1 and 2, a fuel vaporization system 10 is disclosed for producing a mixture of fuel vapor, atomized water and air for delivery into an internal combustion engine I, the system 10 being configured and positioned relative to the internal combustion engine I to draw heat from the engine exhaust system E to vaporize fuel for combining into the mixture. The fine atomization of the fuel resulting from the fuel vaporization boosts higher fuel efficiency and causes the engine I to produce significantly more horsepower. The system 10 includes a fuel tank 20 for holding fuel prior to vaporization, a vacuum pump 14 or vacuum drawn off the intake manifold of the engine with a check valve to hold and contain less than atmospheric pressure in fuel tank 20, a fuel pump 30 in fluid communication with the fuel tank 20 for delivering fuel from the fuel tank 20, a fuel metering valve 40 in fluid communication with the fuel pump 30 for metering the flow of fuel from the fuel tank 20, a vapor collecting chamber 50 in fluid communication with the fuel metering valve 40 for holding a quantity of fuel while the fuel quantity of fuel is vaporized, the vapor collecting chamber 50 being in thermal communication with the engine exhaust system E to draw fuel vaporizing heat from the exhaust system E, vaporized fuel blowing means 60 mounted within the vapor collecting chamber 50 for pushing and uniformly distributing the fuel vapor, a molecule mixture box 70 in fluid communication with the vapor collecting chamber 50 to receive vaporized fuel from the chamber 50, with a throttle mounting opening 72 in the molecule mixture box wall containing a throttle butterfly 74 having a throttle mechanism for regulating the flow of air from the surrounding atmosphere into the molecule mixture box 70, an air filter 76 mounted above the throttle mounting opening 72 to filter air entering the throttle 74, a pressurizing air/water pump 80 in fluid communication with the molecule mixture box 70, an air intake structure 90 in fluid communication with the air/water pump 80 for delivering air through the air/water pump 80 into the molecule mixture box 70, a water holding tank 110 in fluid communication with the air/water pump 80 for delivering water through the air/water pump 80 into the mixture box 70, an air/water injector 120 positioned to receive and transform the air and water exiting the pump 80 into a fine mist spray as the air and water enter the molecule mixture box 70, and a mixture delivery means 130 for guiding the mixture from the molecule mixture box 70 into an intake manifold or port of an internal combustion engine I, the mixture delivery means 130 including a passageway with internal axially progressing spiral fins 132 for stirring the mixture. The water holding tank 110, air intake structure 90, air/water pump 80 and air/water injector 120 preferably are placed in fluid communication with each other through a tubular air/water fluid manifold 82. The fuel tank 20, fuel pump 30 and fuel metering valve 40 preferably are placed in fluid communication with each other through a segmented fuel line 12. The vaporized fuel blowing means 60 preferably includes a turbine blade 62 rotatably mounted within the vapor collecting chamber 50 and a turbine blade drive shaft 64 onto which the turbine blade 62 is mounted extending through and sealingly abutting a port in the vapor collecting chamber 50 to a turbine drive motor 66 located outside the vapor collecting chamber 50, to assure that no electric sparks escape from the motor 66 into the chamber 50. The molecule mixture box 70 is preferably in fluid communication with the upper portion of the vapor collecting chamber 50, to receive fuel only in its vaporized state. The fuel metering valve 40 preferably is a flow control needle valve. The internal combustion engine I preferably includes a fuel burning cylinder C with a cylinder head B through which the fuel mixture is delivered by the spiral mixture delivery means 130 into the cylinder C, and the engine exhaust system E includes an exhaust pipe P passing adjacent to the vapor collecting chamber 50. The exhaust pipe P opens through an exhaust release structure R into the surrounding atmosphere, and is shown including a muffler M.

Method

In practicing the invention, the following method may be used. The method includes the steps of delivering sufficient heat into the fuel to transform the fuel into vaporized fuel; atomizing water with air into a water/air mist; mixing metered quantities of the vaporized fuel and water/air mist with a metered quantity of outside air to produce a volatile fuel mixture; and delivering the volatile fuel mixture into a cylinder of an internal combustion engine.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A fuel vaporization and mixing system for producing a mixture of fuel vapor, atomized water and air for delivery into an internal combustion engine having an engine exhaust system, comprising:

a fuel source for holding fuel prior to vaporization;

a fuel pump in fluid communication with said fuel source for delivering fuel from said fuel source;

a vapor collecting chamber in fluid communication with said fuel pump for holding a quantity of fuel while the quantity of fuel is vaporized, said vapor collecting chamber being in thermal communication with the engine exhaust system to draw fuel vaporizing heat from the exhaust system;

a molecule mixture box having a box wall and being in fluid communication with said vapor collecting chamber for receiving vaporized fuel from said vapor collecting chamber;

a pressurizing air/water pump in fluid communication with the molecule mixture box;

an air intake structure in fluid communication with said air/water pump for delivering air through said air/water pump into said molecule mixture box;

a water source in fluid communication with said air/water pump for delivering water through said air/water pump into said molecule mixture box;

and an air/water aerating means positioned to receive aerate and mix the air water exiting said air/water pump as the air and water enter said molecule mixture box;

additionally comprising fuel blowing means mounted within said vapor collecting chamber for pushing and uniformly distributing fuel vapor; and wherein said fuel blowing means comprises a turbine blade rotatably mounted within said vapor collecting chamber and a turbine blade drive shaft onto which said turbine blade is mounted extending through and sealingly abutting a port in said vapor collecting chamber to a turbine drive motor located outside said vapor collecting chamber and drivably connected to said turbine blade drive shaft.

2. The fuel vaporization and mixing system of claim 1, wherein said fuel source is a fuel tank.

3. The fuel vaporization and mixing system of claim 1, additionally comprising a mixture delivery means comprising a spiral stirring means for guiding the mixture from said molecule mixture box to an internal combustion engine.

4. The fuel vaporization and mixing system of claim 1, additionally comprising:
a throttle mounting opening in said molecule mixture box wall;
and a throttle within said throttle mounting opening having a throttle body for regulating the flow of air from the surrounding atmosphere into said molecule mixture box.

5. The fuel vaporization and mixing system of claim 4, additionally comprising an air filter mounted to said throttle body to filter air entering said throttle.

6. The fuel vaporization and mixing system of claim 1, wherein said water source is a water holding tank.

7. The fuel vaporization and mixing system of claim 1, wherein said water source, said air intake structure, said air/water pump and said air/water aerating means are placed in fluid communication with each other through a tubular air/water fluid manifold.

8. The fuel vaporization and mixing system of claim 1, wherein said vapor collecting chamber has an upper portion and wherein said molecule mixture box is in fluid communication with the upper portion of said vapor collecting chamber, to receive fuel only in vapor state.

9. The fuel vaporization and mixing system of claim 1, additionally comprising a fuel metering valve in fluid communication with said fuel pump for metering the flow of fuel from said fuel source into said vapor collecting chamber.

10. The fuel vaporization and mixing system of claim 9, wherein said fuel source, said fuel pump and said fuel metering valve are in fluid communication with each other through a segmented fuel line.

11. The fuel vaporization and mixing system of claim 9, wherein said fuel metering valve is a flow control metering valve.

12. The fuel vaporization and mixing system of claim 1, wherein said fuel source holds fuel under a vacuum.

13. An internal combustion engine with a fuel vaporization and mixing system, comprising:

a fuel burning cylinder with a cylinder head for receiving a fuel mixture into said fuel burning cylinder;

an engine exhaust system;

a fuel source for holding fuel prior to vaporization;

a fuel pump in fluid communication with said fuel source for delivering fuel from said fuel source;

a vapor collecting chamber in fluid communication with said fuel pump for holding quantity of fuel while the quantity of fuel is vaporized, said vapor collecting chamber being in thermal communication with the engine exhaust system to draw fuel vaporizing heat from the exhaust system;

a molecule mixture box having a box wall and being in fluid communication with said vapor collecting chamber for receiving vaporized fuel from said vapor collecting chamber;

a pressurizing air/water pump in fluid communication with the molecule mixture box;

an air intake structure in fluid communication with said air/water pump for delivering air through said air/water pump into said molecule mixture box;

a water source in fluid communication with said air/water pump for delivering water through said air/water pump into said molecule mixture box;

an air/water aerating means positioned to receive aerate and mix the air and water exiting said air/water pump as the air and water enter said molecule mixture box;

a mixture delivery means for guiding and stirring the mixture from said molecule mixture box into said fuel burning cylinder;

additionally comprising fuel blowing means mounted within said vapor collecting chamber for pushing and uniformly distributing fuel vapor;

wherein said fuel blowing means comprises a turbine blade rotatably mounted within said vapor collecting chamber and a turbine blade drive shaft onto which said turbine blade is mounted extending through and sealingly abutting a port in said vapor collecting chamber to a turbine drive motor located outside said vapor collecting chamber and drivably connected to said turbine blade drive shaft.

14. The internal combustion engine of claim 13, wherein said mixture delivery means comprises a spiral passageway through which the mixture flows to stir the fuel mixture.

\* \* \* \* \*